(12) United States Patent
Bayer et al.

(10) Patent No.: US 11,460,092 B2
(45) Date of Patent: Oct. 4, 2022

(54) BOLT TYPE ANGULAR GEAR MECHANISM

(71) Applicant: WITTENSTEIN SE, Igersheim (DE)

(72) Inventors: Thomas Bayer, Igersheim (DE);
Johannes Rôder, Weikersheim (DE);
Michael Schmidt, Reichenberg (DE)

(73) Assignee: WITTENSTEIN SE, Igersheim (DE)

( * ) Notice: Subject to any disclaimer, the term of this patent is extended or adjusted under 35 U.S.C. 154(b) by 199 days.

(21) Appl. No.: 16/575,667

(22) Filed: Sep. 19, 2019

(65) Prior Publication Data
US 2020/0096079 A1 Mar. 26, 2020

(30) Foreign Application Priority Data
Sep. 20, 2018 (DE) .......................... 102018123168.7

(51) Int. Cl.
*F16H 1/20* (2006.01)
*F16H 55/17* (2006.01)

(52) U.S. Cl.
CPC ............. *F16H 1/203* (2013.01); *F16H 55/17* (2013.01)

(58) Field of Classification Search
CPC . F16H 1/203; F16H 55/17; F16H 1/22; F16D 3/08
See application file for complete search history.

(56) References Cited

U.S. PATENT DOCUMENTS

| 431,030 A | | 7/1890 | Boone | |
|---|---|---|---|---|
| 1,119,514 A | * | 12/1914 | Jonsson | F16D 3/08 464/50 |
| 1,420,635 A | * | 6/1922 | Klopper | B25B 17/00 81/57.3 |

FOREIGN PATENT DOCUMENTS

| DE | 845435 C | 7/1952 |
|---|---|---|
| DE | 102017118571 A1 | 2/2019 |
| FR | 514647 A | 3/1921 |
| JP | 6165916 A | 4/1986 |

* cited by examiner

*Primary Examiner* — Zakaria Elahmadi
(74) *Attorney, Agent, or Firm* — Bachman & LaPointe, P.C.

(57) ABSTRACT

Bolt type angular gear mechanism (1) for transmitting a rotational movement from a first shaft to a second shaft which is orientated at an angle with respect to the first shaft, comprising a plurality of angular bolts (31, 32) each having two members, a first bolt carrier (21) which can be rotated about a first axis and which has receiving members (4) for the first members of the angular bolts (31, 32) in each case, a second bolt carrier (22) which can be rotated about a second axis and which has receiving members (4) for the second members of the angular bolts (31, 32) in each case so that the bolt carriers (21, 22) are connected by means of the angular bolts (31, 32), wherein the axes define an angle, and wherein the members of the angular bolts (31, 32) are each constructed in a cylindrical manner as far as a plane of the angle bisector between the axes.

20 Claims, 5 Drawing Sheets

BOLT TYPE ANGULAR GEAR MECHANISM

BACKGROUND OF THE INVENTION

The invention relates to a bolt type angular gear mechanism for transmitting a rotational movement from a first shaft to a second shaft which is orientated at an angle with respect to the first shaft.

Bolt type angular gear mechanisms are under some circumstances subjected to powerful bending torques.

From the prior art, such as, for example, JPS 6 165 916 A, carrier couplings or bolt type angular gear mechanisms which transmit a torque from a first shaft to a second shaft are known, wherein the shafts are located orthogonally with respect to each other.

However, known bolt type angular gear mechanisms have under some circumstances only inadequate torsion resistance. Furthermore, the known systems have between the angular bolts and angular bolt receiving members for some applications excessive guide play or excessive circumferential backlash.

SUMMARY OF THE INVENTION

An object of the invention is to provide an improved bolt type angular gear mechanism, in particular embodiments should provide improved torsion resistance or reduced guide play or circumferential backlash.

According to an aspect of the invention, a bolt type angular gear mechanism is provided to transmit a rotational movement from a first shaft to a second shaft which is orientated at an angle with respect to the first shaft, comprising a plurality of angular bolts each having two members, a first bolt carrier which can be rotated about a first axis and which has receiving members for the first members of the angular bolts in each case, a second bolt carrier which can be rotated about a second axis and which has receiving members for the second members of the angular bolts in each case so that the bolt carriers are connected by means of the angular bolts, wherein the axes define an angle and wherein the members of the angular bolts are each constructed in a cylindrical manner as far as a plane of the angle bisector between the axes.

Another aspect of the invention relates to a bolt type angular gear mechanism for transmitting a rotational movement from a first shaft to a second shaft which is orientated at an angle with respect to the first shaft, comprising a plurality of angular bolts each having two members, a first bolt carrier which can be rotated about a first axis and which has receiving members for the first members of the angular bolts in each case, a second bolt carrier which can be rotated about a second axis and which has receiving members for the second members of the angular bolts in each case so that the bolt carriers are connected by means of the angular bolts, wherein the axes define an angle, wherein the receiving members are arranged in the bolt carriers with angular spacings with respect to each other, wherein at least two of the angular spacings are different.

Another aspect of the invention relates to a bolt type angular gear mechanism for transmitting a rotational movement from a first shaft to a second shaft which is orientated at an angle with respect to the first shaft, comprising a plurality of angular bolts each having two members, a first bolt carrier which can be rotated about a first axis and which has receiving members for the first members of the angular bolts in each case, a second bolt carrier which can be rotated about a second axis and which has receiving members for the second members of the angular bolts in each case so that the bolt carriers are connected by means of the angular bolts, wherein the axes define an angle, wherein the receiving members of the bolt carriers are arranged in each of the bolt carriers on at least two reference circles.

Typically, the receiving members of the first bolt carrier are at least substantially parallel with the first axis. Typically, the receiving members of the second bolt carrier are at least substantially parallel with the second axis.

Typically, the axes define an angle greater than 0°, greater than 45° or greater than 85°. In typical embodiments, the axes define an angle less than 180°, less than 135° or less than 95° or of at least substantially 90°.

Typical bolt type angular gear mechanisms in the context of the invention have in this instance a first bolt carrier, which comprises receiving members which are substantially parallel with the axis of the first bolt carrier.

Typically, the receiving members of the second bolt carrier are substantially parallel with the axis of the second bolt carrier.

Typical embodiments of the invention have receiving members in each of the bolt carriers which are located on a reference circle. Other embodiments have at least two reference circles with different radii on which the receiving members are located. Typically, a first group of receiving members is located on a first reference circle and a second group of receiving members is located on a second reference circle which has a second radius different from the first reference circle. Typically, the term reference circle is used to refer to a circle through the center points of receiving members or a group of receiving members. The reference circle is in typical embodiments a circle which can be constructed on a front side of the bolt carrier. The front side of a bolt carrier is intended in particular to refer to the side of the bolt carrier which faces in the direction of the intersections of the axes. The front sides of the bolt carriers are in each case connected to each other by means of angular bolts.

A conical front side is in a typical embodiment of the invention a front side of a bolt carrier which is constructed as a cone or a truncated cone. The conical embodiment formed in this manner enables shortening of the length of the angular bolts which is not guided in a receiving member of the bolt carrier.

Typically the receiving members of the angular bolts are each located at least partially or completely inside the conical face. The term "conical face" is intended in this instance to refer to the portion of the front side which is constructed obliquely relative to the axis. In a typical embodiment of the invention, the receiving members of the angular bolts are completely inside the conical face of the bolt carriers. In typical embodiments, the receiving members of the angular bolts are located at least partially outside the conical face on the front side of the bolt carriers.

In a typical embodiment of the invention, the angle of inclination of the conical faces corresponds in each case at least substantially to half of the angle between the bolt carriers. Typically, the angle of inclination of the conical faces at the front side of the bolt carriers is substantially equal to half of the angle between the axes of the bolt carriers, or the angle of inclination typically has a maximum deviation of half of the angle between the axes of substantially a maximum of 1°, typically substantially a maximum of 2°, typically substantially a maximum of 3° or typically substantially more than 0.1° or typically less than 5°.

An angle indication typically relates in this instance to the smallest angle between two portions or axes or faces.

Typically, there are different angular spacings between two adjacent receiving members in each case, in particular between two adjacent receiving members which are located on a reference circle. The angular spacings relate to the respective center points of the receiving members. The angular spacing relates in particular to the angle between the center point of a receiving member and the receiving member which is in particular located directly adjacent on the same reference circle. In a typical embodiment of the invention, the angular spacing varies in accordance with the random principle. In other embodiments, the different angular spacings are arranged in a regular sequence, for example, alternately two different spacings or with constant repetition three different spacings.

In a typical embodiment of the invention, the angular spacings between the receiving members of a bolt carrier alternate. Alternating the angular spacings refers to at least two different angular spacings which are located between adjacent receiving members on a reference circle, wherein the angular spacings alternate over the reference circle in a peripheral direction of the bolt carrier between two receiving members on the reference circle in each case.

In a typical embodiment of the invention, the receiving members of the first bolt carrier with a first angular spacing are connected to each other to the receiving members of the second bolt carrier with a second angular spacing which differs from the first angular spacing by means of two angular bolts. The angular spacings change alternately in embodiments. This represents one of several possibilities in the context of the invention for reducing the play. A connection of two bolt carriers with angular bolts which are supported in receiving members with different angular spacings in the bolt carriers brings about in embodiments a pretensioning which can reduce play.

In embodiments with two circles of holes, a torsion of the first hole circle of the first bolt carrier with respect to the second hole circle of the first bolt carrier is different in comparison with a torsion of the first hole circle of the second bolt carrier with respect to the second hole circle of the second bolt carrier. In this manner, inserting the angular bolts produces a tension which can minimize the play. The difference in the torsion may, for example, be at least 0.01°, or at least 0.05° or up to 0.1° or up to 0.2° or up to 1°.

Typical embodiments have angular bolts having an angular difference. The angular difference between the bolt carriers may, for example, be at least 0.01°, or at least 0.05° or up to 0.1° or up to 0.2° or up to 1° of the hole circle of the corresponding receiving members. By providing some angular bolts with an angular offset together with angular bolts without any angular offset, a pretensioning in order to reduce play can be brought about.

In typical embodiments of the invention, the reference circle is arranged on a bolt carrier or the reference circles are arranged on a bolt carrier substantially concentrically relative to the axis of the bolt carrier.

Typically, bolt carriers have at least two reference circles with different radii. Different radii produce an inner and an outer reference circle on the bolt carriers, where applicable in the case of at least three reference circles still at least one central reference circle.

The receiving members, which are located on the inner reference circle, have in embodiments a different receiving diameter from that of the receiving members on the outer reference circle. Typically, the diameters of the receiving members on a plurality of reference circles with different radii have different receiving diameters. In a typical embodiment of the invention, the diameters of the receiving members of at least two reference circles are at least substantially equal. Typically, embodiments with different receiving member diameters accordingly have differently sized angular bolts for support in the respective receiving members.

In a typical embodiment of the invention, the reference circles in total or the single reference circle has/have at least six angular bolts, typically at least eight angular bolts, typically at least 10 angular bolts or typically less than 20 angular bolts, typically less than 15 angular bolts, typically up to 12 angular bolts.

Typically, the number of receiving members with angular bolts received therein is different on different reference circles of a bolt carrier. In this manner, wall thickness relationships can be optimized. In other embodiments, the number is identical. Typically, the wall thickness relationship or the wall thickness between the receiving members is substantially at least 40% of the angular bolt diameter, or at least 50% of the angular bolt diameter, or a maximum of 80% of the angular bolt diameter or a maximum of 100% of the angular bolt diameter or less than 100% of the angular bolt diameter. Typically, the wall thickness relationship relates to a relationship of the wall thickness between two receiving members with respect to the angular bolt diameter.

In a typical embodiment of the invention, at least one of the bolt carriers has a hole which is constructed as a through-hole. Typically, the hole is constructed centrally on the axis of the bolt carrier. Typically, the through-hole of the bolt carrier forms with the conical face an edge at the front side of the bolt carrier. Typically, the edge has between the through-hole of the bolt carrier and the conical face a chamfer, flattened portion or rounded portion, for example, in order to facilitate passage of cables. In embodiments, the edge is constructed to be sharp.

Typically, the angular bolts according to the invention are not bent in terms of their shape. Typically, the angular bolts do not have a bending radius on the angle bisector. In other embodiments, bent angular bolts are used. Typically, the angular bolts have in the angle bisector in a section along the angle bisector at least substantially an elliptical cross-section.

Typically, the angular bolts are produced using a joining method, such as, for example, by means of welding or adhesive-bonding. Typically, two members are joined at an angle which at least substantially corresponds to the angle between the first and the second axis to form an angular bolt. Embodiments with joined members typically have a high level of rigidity.

Typically, an angular bolt of a substantially right-angled bolt type angular gear mechanism is produced as follows: producing two members with miters, which are at least substantially 45°, and joining the members at least substantially at 90°.

In typical embodiments, an angular bolt is produced from one piece and formed in such a manner that there are produced in this instance two members which have an angle which at least substantially corresponds to the angle between the first and the second axis.

The two members typically have a maximum deviation of the angle between the axes of substantially a maximum of 1°, typically substantially a maximum of 2°, typically substantially a maximum of 3° or typically substantially more than 0.01° or typically substantially less than 5°. Typical production methods for angular bolts are, for example, forging methods, such as, for example, drop forging or open die forging or multi-directional forging, generative or additive methods, such as, for example, 3D printing or selective laser sintering or casting methods, such as, for example, casting methods with broken molds or sand casting.

As a result of an angular bolt which is not provided with a bending radius, a more extensive guiding of the angular bolts in the receiving members is possible. A conical face can be guided up to or close to, for example, up to less than 2 mm or up to less than 1 mm from, the angle bisector. In this manner, the rigidity of embodiments with respect to previously known mechanisms can be improved. The conical faces may be moved toward each other as far as an air gap or they can be supported as far as direct contact with each other.

Typically, a bolt type angular gear mechanism according to a typical embodiment of the invention is used to transmit a torque from a first shaft to a second shaft, wherein the axes of the shafts define an angle.

BRIEF DESCRIPTION OF THE DRAWINGS

Embodiments of the invention are explained in greater detail below with reference to the appended drawings, in which.

DETAILED DESCRIPTION

Typical embodiments of the invention are described below, wherein the same reference numerals are used for components which are identical or similar and are not explained again with each Figure. The invention is not limited to the typical embodiments described below.

Figure 1:
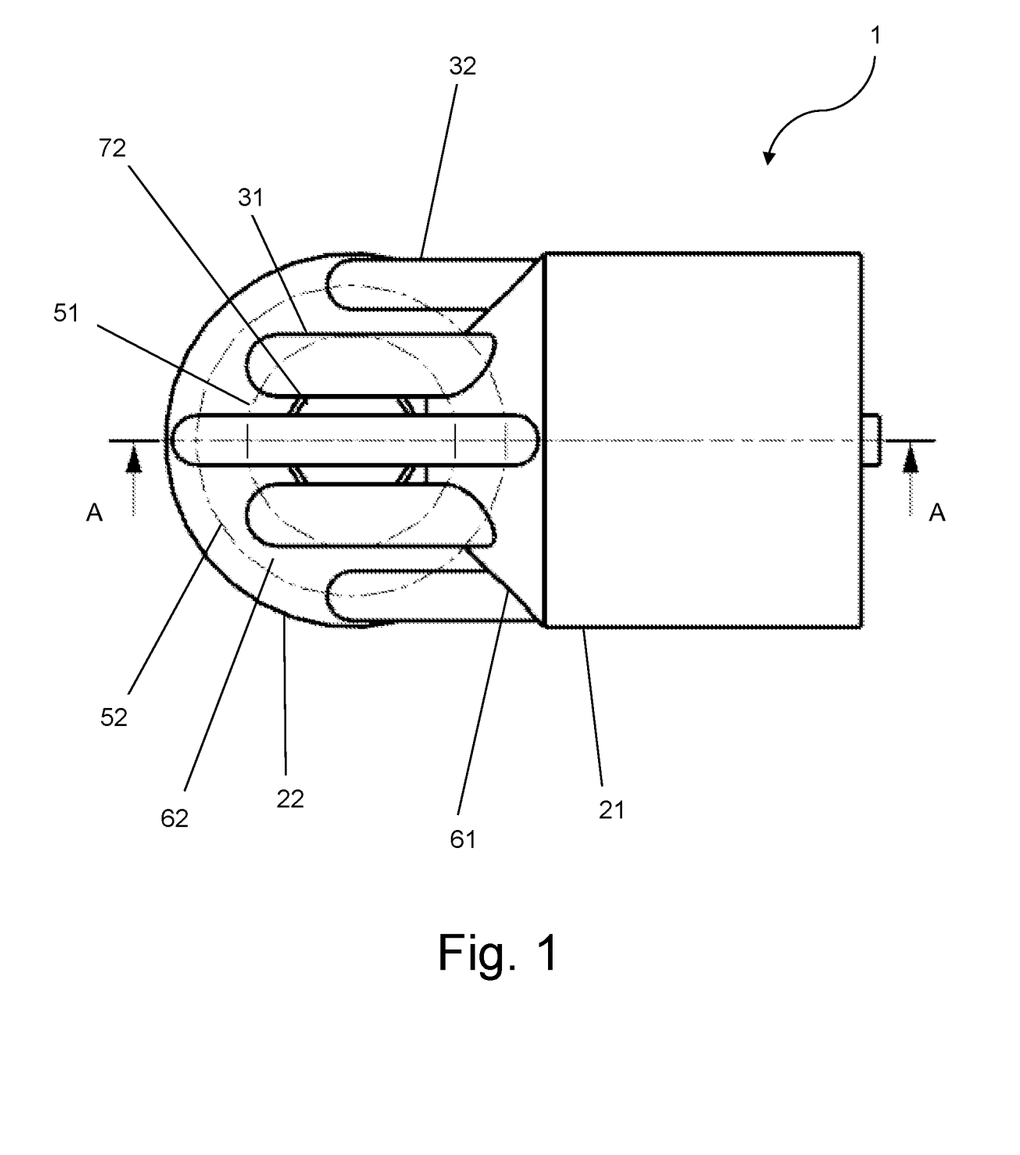
FIG. 1 is a plan view of a bolt type angular gear mechanism according to an embodiment with two reference circles with different diameters of the angular bolts.

FIG. 1 shows a bolt type angular gear mechanism 1 with a first bolt carrier 21 and a second bolt carrier 22. Both bolt carriers 21, 22 each have two reference circles, an inner reference circle 51 and an outer reference circle 52. The inner reference circle 51 comprises in the embodiment shown by way of example four angular bolts 31. The outer reference circle 52 comprises in the embodiment shown four angular bolts 32, of which three are illustrated in FIG. 1. The angular bolts 31 of the inner reference circle 51 differ from the angular bolts 32 of the outer reference circle 52 in their respective diameter.

The diameters of the angular bolts 32 on the outer reference circle 52 have in the embodiment shown a smaller diameter than the angular bolts 31 on the inner reference circle 51.

The front sides of the bolt carriers 21, 22 are constructed as a truncated cone and each have a conical face 61, 62. The first bolt carrier 21 is orientated in a first axis and the second bolt carrier 22 is orientated in a second axis. The axes are arranged at an angle with respect to each other. In the present embodiment, this is a 90° angle.

At the right side of the bolt type angular gear mechanism 1, as shown in FIG. 1, a portion of a member of one of the angular bolts 32 of the outer reference circle 52 can be seen. The angular bolt 32 is supported in its position of the revolution of the bolt type angular gear mechanism completely in the receiving member 4 thereof (see FIG. 2).

In the embodiment of FIG. 1, the bolt carrier 22 is constructed as a hollow shaft. The bolt carrier 22 has a central hole 72 which is constructed as a through-hole and which is illustrated here in perspective. The angular bolts 31, 32 are in the embodiment shown arranged with the respective receiving members thereof completely in the conical faces 61, 62 of the respective bolt carrier 21, 22.

In a typical embodiment of the invention, the bolt carriers are constructed as a solid shaft. Typically, the bolt carriers are constructed as a hollow shaft.

An angular indication in this regard typically relates to the smallest angle between, for example, two portions or two axes or a portion and an axis.

Figure 2:
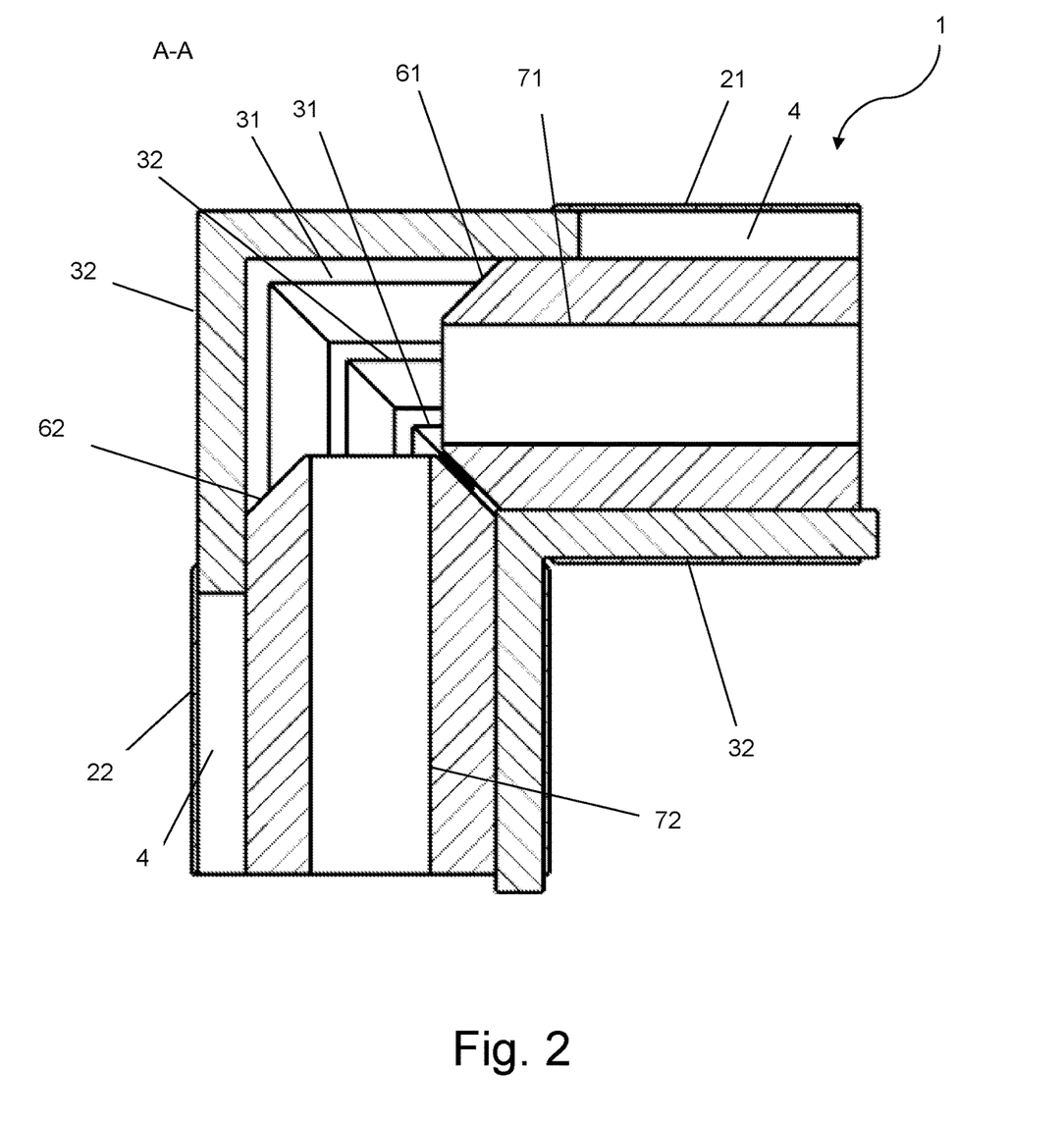
FIG. 2 is a section through the bolt type angular gear mechanism shown in FIG. 1.

FIG. 2 shows a section indicated in FIG. 1 through the bolt type angular gear mechanism 1.

The two bolt carriers 21, 22 which are constructed as a hollow shaft are illustrated in section. The bolt carriers 21, 22 each have a central hole 71, 72 which is constructed as a through-hole.

The angular bolts 31, 32 are guided in receiving members 4 of the bolt carriers 21, 22, wherein the receiving members 4 are each arranged on two reference circles 51, 52. The reference circles 51, 52 comprise the inner reference circle 51 and the outer reference circle 52.

The receiving members 4 of the outer reference circle 52 serve to receive angular bolts 32 with a smaller diameter. The receiving members 4 of the inner reference circle 51 serve to receive angular bolts 31 with a relatively larger diameter.

The angular bolt 32 of the outer reference circle 52 as shown in section at the bottom in the illustration in FIG. 2 is supported in this instance in the position thereof substantially completely with the members thereof in the receiving members 4 of the two bolt carriers 21, 22.

Furthermore, the embodiment of FIG. 2 has another angular bolt 32 which is shown in section and which is located at the top in the illustration of FIG. 2. In the position shown in FIG. 2, only a small portion of the members of the angular bolt 32 is received and supported in the respective receiving members 4 thereof.

Shown by way of example in the embodiment of FIG. 2 the conical faces 61, 62 of the bolt carriers 21, 22 are guided close to the angle bisector of the bolt type angular gear mechanism.

In a typical embodiment of the invention, the angular bolts have two members which in the angle bisector of the bolt type angular gear mechanism meet each other in such a manner that the members of the angular bolt can be supported substantially over the entire member length thereof in the receiving members of the angular bolt in the bolt carriers. Typically, in embodiments, the angular bolts have two members which meet each other in the angle bisector of the bolt type angular gear mechanism, substantially in the form of an ellipse.

In the exemplary embodiment of FIG. 2, the axes of the bolt carriers 21, 22 are at an angle of 90° relative to each other. The conical face 61, 62 of the front side of the bolt carriers 21, 22 is inclined at an angle relative to the axis of the respective bolt carrier 21, 22 which corresponds to the angle of the angle bisector between the axes of the bolt carriers 21, 22.

Typically, the conical face takes up only a portion of the front side of a respective bolt carrier. Typically, the receiving members are located completely inside the conical face.

Figure 3:
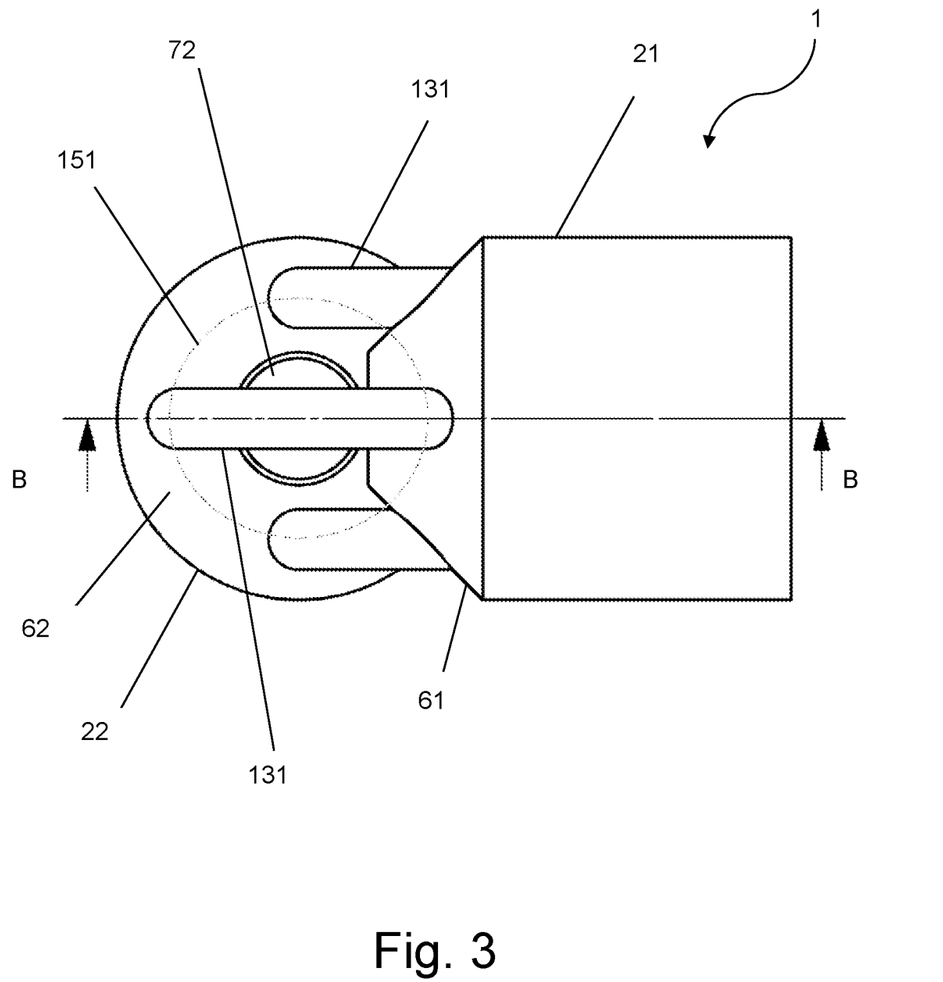
FIG. 3 is a plan view of a bolt type angular gear mechanism according to an embodiment with a reference circle.

In FIG. 3, a bolt type angular gear mechanism 1 is shown with a first bolt carrier 21 and a second bolt carrier 22. Both bolt carriers 21, 22 each have precisely one reference circle 151. The reference circle 151 comprises in the embodiment shown by way of example four angular bolts 131, of which three are illustrated in FIG. 3.

The front sides of the bolt carriers 21, 22 are constructed as a truncated cone and each have a conical face 61, 62. The first bolt carrier 21 is orientated in a first axis and the second bolt carrier 22 is orientated in a second axis. The axes are arranged at an angle with respect to each other. In the present embodiment, this is a 90° angle.

In the embodiment of FIG. 3, the bolt carrier 22 is constructed as a hollow shaft. The bolt carrier 22 has a central hole 72 which is constructed as a through-hole and which is illustrated here in perspective. The angular bolts 131 are in the embodiment shown arranged with the receiving members thereof completely in the conical faces 61, 62 of the respective bolt carrier 21, 22.

Figure 4:
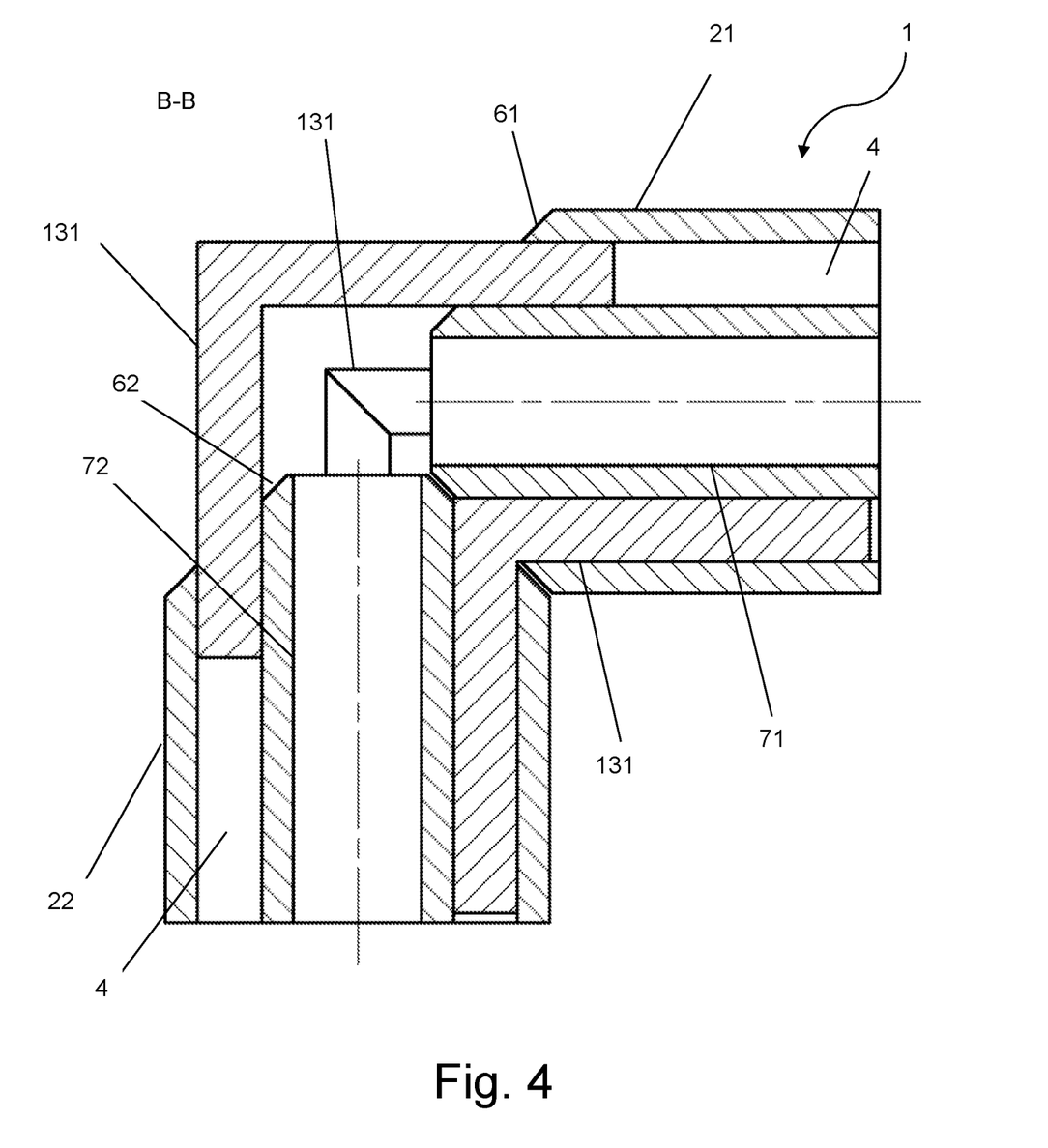
FIG. 4 is a section through the bolt type angular gear mechanism shown in FIG. 3.

In FIG. 4, a section which is indicated in FIG. 3 through the bolt type angular gear mechanism 1 is shown. There are illustrated in section the two bolt carriers 21, 22 which are constructed as a hollow shaft. The bolt carriers 21, 22 each have a central hole 71, 72 which is constructed as a through-hole.

The angular bolts 131 are guided in receiving members 4 of the bolt carriers 21, 22, wherein the receiving members 4 are each arranged on a reference circle 151.

The angular bolt 131 of the reference circle 151 which is shown in section and which is located at the bottom in the illustration in FIG. 4, is supported in this instance in its position substantially completely with the members thereof in the receiving members 4 of the two bolt carriers 21, 22.

Furthermore, the embodiment of FIG. 4 has another angular bolt 131 which is shown in section and which is located at the top in the illustration of FIG. 4. In the position shown in FIG. 4, only a small portion of the members of the angular bolt 32 is received and supported in the respective receiving members 4 thereof.

In the embodiment of FIG. 4 shown by way of example, the conical faces 61, 62 of the bolt carriers 21, 22 are guided close to the angle bisector of the bolt type angular gear mechanism 1.

In the exemplary embodiment of FIG. 4, the axes of the bolt carriers 21, 22 are located at an angle of 90° with respect to each other. The conical face 61, 62 of the front side of the bolt carriers 21, 22 is inclined at an angle with respect to the axis of the respective bolt carrier 21, 22 which corresponds to the angle of the angle bisector between the axes of the bolt carriers 21, 22.

Figure 5:
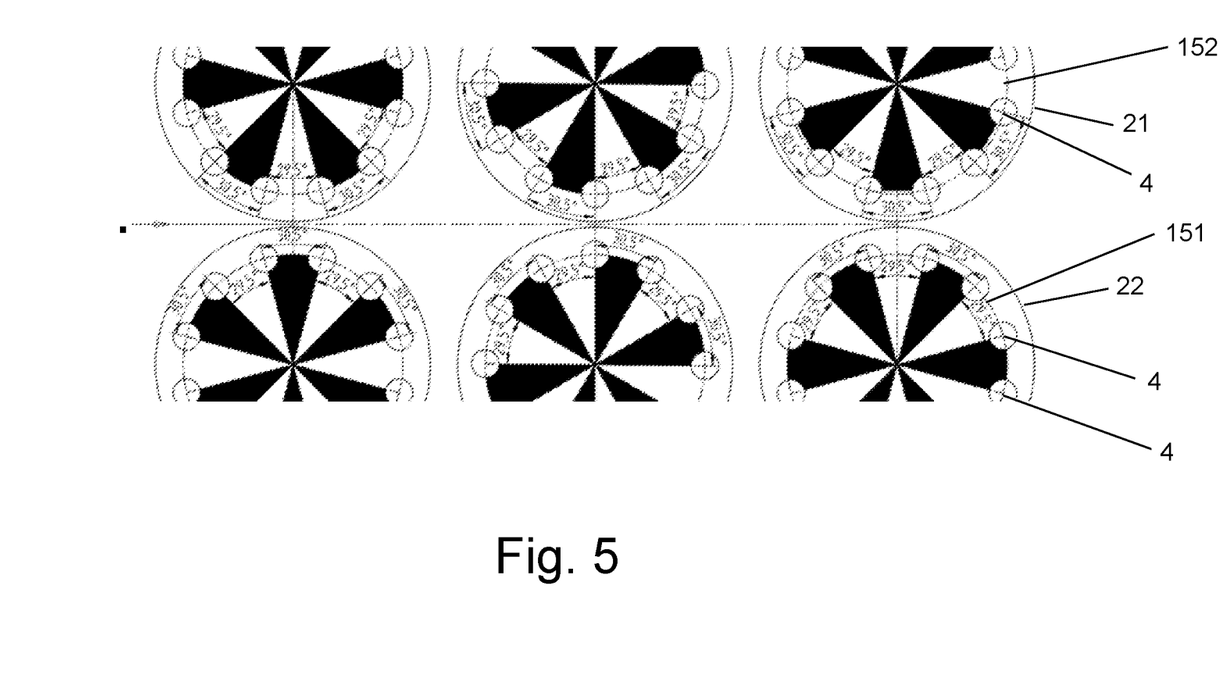
FIG. 5 is a view of a bolt type angular gear mechanism according to an embodiment in which the front sides of the two bolt carriers face each other and a rotation of the bolt type angular gear mechanism shows by way of example with reference to the receiving members which are connected to each other by means of angular bolts.

In FIG. 5, a bolt type angular gear mechanism 1 with different angular spacings of the receiving members 4 on the respective bolt carriers 21, 22 in three sequential states of a rotation of the bolt type angular gear mechanism 1 is shown. The bolt carriers 21, 22 have in the exemplary embodiment shown in each case a reference circle 151, 152 on which receiving members 4 for angular bolts are arranged.

For example, the angular spacings alternate in the embodiment shown in FIG. 5 with 30.5° and 29.5°. The angular spacings relate to the centers of adjacent receiving members 4. The angle is in each case defined between the center of a receiving member 4, the axis of the bolt carrier 21, 22 and the center of an adjacent receiving member 4.

Typically, at least two angular spacings alternate on a bolt carrier in each case.

In the states shown of a rotation of the bolt type angular gear mechanism 1 illustrated in FIG. 5, different angular spacings between the receiving members 4 of the first bolt carrier 21 and the second bolt carrier 22 meet each other. Different angular spacings between the receiving members (4) of the first bolt carrier 21 and the second bolt carrier 22 are located opposite each other in the illustration of the embodiment of FIG. 5.

In a typical embodiment of the invention, the first bolt carrier has alternating angular spacings and the second bolt carrier has constant angular spacings between the receiving members of the angular bolts. In this manner, only one bolt carrier with alternating angular spacings has to be constructed. Typically, angular bolts lead from the receiving members of the angular bolts which are spaced with a first angular spacing and which are located on a first bolt carrier to receiving members of the angular bolts on a second bolt carrier which are spaced with a second angular spacing which differs from the first angular spacing.

The invention claimed is:

1. Bolt type angular gear mechanism for transmitting a rotational movement from a first shaft to a second shaft which is orientated at an angle with respect to the first shaft, comprising:
   a plurality of angular bolts each having two members,
   a first bolt carrier which can be rotated about a first axis and which has receiving members for the first members of the angular bolts in each case,
   a second bolt carrier which can be rotated about a second axis and which has receiving members for the second members of the angular bolts in each case so that the bolt carriers are connected by means of the angular bolts,
   wherein the axes define an angle,
   wherein the receiving members are arranged in the bolt carriers with angular spacings with respect to each other, wherein at least two of the angular spacings are different, wherein
      the receiving members of the angular bolts which are located on a first bolt carrier and which are spaced apart with a first angular spacing are located opposite the receiving members of the angular bolts on a second bolt carrier which are spaced apart with a second angular spacing which is different from the first angular spacing
   or
      at least a part of the angular bolts comprise an angular offset.

2. Bolt type angular gear mechanism according to claim 1, wherein the members of the angular bolts are each constructed in a cylindrical manner as far as a plane of the angle bisector between the axes.

3. Bolt type angular gear mechanism according to claim 1, wherein the receiving members of the bolt carriers are arranged in each of the bolt carriers on at least two reference circles with different radii.

4. Bolt type angular gear mechanism according to claim 1, wherein the bolt carriers each form an at least partially conical front side with a conical face, wherein all the receiving members for the angular bolts are in each case located at least partially or completely inside the conical face.

5. Bolt type angular gear mechanism according to claim 1, wherein the angle of inclination of the conical faces corresponds in each case at least substantially to half of the angle between the bolt carriers.

6. Bolt type angular gear mechanism according to claim 1, wherein the receiving members of at least one of the bolt carriers which are located on a reference circle are arranged with at least two alternating angular spacings.

7. Bolt type angular gear mechanism according to claim 1, wherein two receiving members of the first bolt carrier which are spaced apart with a first angular spacing are connected to two receiving members of the second bolt carrier by means of two angular bolts, wherein the receiving members of the second bolt carrier are spaced with a second angular spacing which is different from the first angular spacing.

8. Bolt type angular gear mechanism according to claim 1, wherein the inner angular bolts which are located on an inner reference circle of the reference circles have a larger diameter or a smaller diameter than the outer angular bolts of an outer reference circle of the reference circles.

9. Bolt type angular gear mechanism according to claim 1, wherein the single reference circle or all the reference circles in total has/have at least six and/or a maximum of 20 angular bolts.

10. Bolt type angular gear mechanism according to claim 1, wherein the bolt carriers each have a central hole which is constructed as a through-hole.

11. Bolt type angular gear mechanism according to claim 1, wherein the angular bolts are produced by means of: producing two members with miters, which are at least substantially 45°, and joining the members at least substantially at 90°.

12. Use of a bolt type angular gear mechanism according to claim 1 for transmitting a torque from a first shaft to a second shaft, wherein the axes of the shafts define an angle.

13. Bolt type angular gear mechanism for transmitting a rotational movement from a first shaft to a second shaft which is orientated at an angle with respect to the first shaft, comprising:
    a plurality of angular bolts each having two members,
    a first bolt carrier which can be rotated about a first axis and which has receiving members for the first members of the angular bolts in each case,
    a second bolt carrier which can be rotated about a second axis and which has receiving members for the second members of the angular bolts in each case so that the bolt carriers are connected by means of the angular bolts,
    wherein the axes define an angle,
    wherein the receiving members are arranged in the bolt carriers with angular spacings with respect to each other, wherein at least two of the angular spacings are different, and
    wherein the bolt carriers each form an at least partially conical front side with a conical face, wherein all the receiving members for the angular bolts are in each case located at least partially or completely inside the conical face.

14. Bolt type angular gear mechanism according to claim 13, wherein the members of the angular bolts are each constructed in a cylindrical manner as far as a plane of the angle bisector between the axes.

15. Bolt type angular gear mechanism according to claim 13, wherein the receiving members of the bolt carriers are arranged in each of the bolt carriers on at least two reference circles with different radii.

16. Bolt type angular gear mechanism according to claim 13, wherein the angle of inclination of the conical faces corresponds in each case at least substantially to half of the angle between the bolt carriers.

17. Bolt type angular gear mechanism according to claim 13, wherein the receiving members of at least one of the bolt carriers which are located on a reference circle are arranged with at least two alternating angular spacings.

18. Bolt type angular gear mechanism according to claim 13, wherein two receiving members of the first bolt carrier which are spaced apart with a first angular spacing are connected to two receiving members of the second bolt carrier by means of two angular bolts, wherein the receiving members of the second bolt carrier are spaced with a second angular spacing which is different from the first angular spacing.

19. Bolt type angular gear mechanism according to claim 13, wherein the inner angular bolts which are located on an inner reference circle of the reference circles have a larger diameter or a smaller diameter than the outer angular bolts of an outer reference circle of the reference circles.

20. Bolt type angular gear mechanism according to claim 13, wherein the bolt carriers each have a central hole which is constructed as a through-hole.

\* \* \* \* \*